United States Patent
Oono et al.

(10) Patent No.: US 9,496,554 B2
(45) Date of Patent: Nov. 15, 2016

(54) POSITIVE ELECTRODE ACTIVE MATERIAL FOR LITHIUM ION BATTERY, METHOD OF PRODUCING THE SAME, ELECTRODE FOR LITHIUM ION BATTERY, AND LITHIUM ION BATTERY

(75) Inventors: Kouji Oono, Tokyo (JP); Satoru Oshitari, Tokyo (JP)

(73) Assignee: SUMITOMO OSAKA CEMENT CO., LTD. (JP)

(*) Notice: Subject to any disclaimer, the term of this patent is extended or adjusted under 35 U.S.C. 154(b) by 2 days.

(21) Appl. No.: 14/005,630

(22) PCT Filed: Mar. 14, 2012

(86) PCT No.: PCT/JP2012/056539
§ 371 (c)(1),
(2), (4) Date: Sep. 17, 2013

(87) PCT Pub. No.: WO2012/128144
PCT Pub. Date: Sep. 27, 2012

(65) Prior Publication Data
US 2014/0004425 A1    Jan. 2, 2014

(30) Foreign Application Priority Data
Mar. 23, 2011 (JP) .................. 2011-064894

(51) Int. Cl.
*H01M 4/58* (2010.01)
*H01M 10/0525* (2010.01)
*C01B 25/45* (2006.01)

(52) U.S. Cl.
CPC ............ *H01M 4/5825* (2013.01); *C01B 25/45* (2013.01); *H01M 10/0525* (2013.01); *Y02E 60/122* (2013.01); *Y02P 70/54* (2015.11); *Y02T 10/7011* (2013.01)

(58) Field of Classification Search
CPC ............................................. H01M 10/0525
See application file for complete search history.

(56) References Cited

U.S. PATENT DOCUMENTS

| 2009/0130559 A1* | 5/2009 | Okada ............. C01B 25/45 429/224 |
| 2009/0186275 A1* | 7/2009 | Exnar ............. C01B 25/45 429/220 |
| 2010/0163790 A1* | 7/2010 | Ceder ............. C23C 24/06 252/182.1 |

FOREIGN PATENT DOCUMENTS

| JP | A-2007-207637 | 8/2007 |
| JP | A-2008-066019 | 3/2008 |

(Continued)

OTHER PUBLICATIONS

International Search Report for International Patent Application No. PCT/JP2012/056539 (mailed Jun. 19, 2012).

(Continued)

*Primary Examiner* — Patrick Ryan
*Assistant Examiner* — Kiran Akhtar
(74) *Attorney, Agent, or Firm* — Merchant & Gould P.C.

(57) ABSTRACT

Provided is a positive electrode active material for lithium ion batteries, which may be in the form of fine particles with good crystallinity and high purity by suppressing grain growth, and which is capable of improving the charge and discharge capacity and high-rate characteristics, a production method thereof, an electrode for lithium ion batteries, and a lithium ion battery. The positive electrode active material for lithium ion batteries of the invention is a positive electrode active material for lithium ion batteries which are formed from $LiMPO_4$ (provided that, M represents one or more kinds selected from a group consisting of Mn, Co, and Ni). In an X-ray diffraction pattern, a ratio $I(020)/I(200)$ of the X-ray intensity $I(020)$ of a (020) plane around a diffraction angle $2\theta$ of 29° to the X-ray intensity $I(200)$ of a (200) plane around a diffraction angle $2\theta$ of 17° is 3.00 to 5.00, and a specific surface area is 15 $m^2/g$ to 50 $m^2/g$.

6 Claims, 2 Drawing Sheets

(56) References Cited

FOREIGN PATENT DOCUMENTS

| | | |
|---|---|---|
| JP | A-2009-532323 | 9/2009 |
| JP | A-2011-009190 | 1/2011 |
| WO | WO 2007/034823 A1 | 3/2007 |
| WO | WO 2007/113624 A1 | 10/2007 |

OTHER PUBLICATIONS

Padhi et al. "Phospho-olivines as Positive-Electrode Materials for Rechargeable Lithium Batters." *J. Electrochem. Soc.* (144)4, pp. 1188-1194. (1997).

Yamada et al. "Room-temperature miscibility gap in $Li_xFEPO_4$" *Nature Materials* (5), pp. 357-360 (2006).

* cited by examiner

POSITIVE ELECTRODE ACTIVE MATERIAL FOR LITHIUM ION BATTERY, METHOD OF PRODUCING THE SAME, ELECTRODE FOR LITHIUM ION BATTERY, AND LITHIUM ION BATTERY

This application is a U.S. National Stage Application under 35 U.S.C. §371 of International Patent Application No. PCT/JP2012/056539 filed 14 Mar. 2012, which claims the benefit of priority to Japanese Patent Application No. 2011-064894 filed 23 Mar. 2011, the disclosures of all of which are hereby incorporated by reference in their entireties. The International Application was published in Japanese on 27 Sep. 2012 as WO 2012/128144.

TECHNICAL FIELD

The present invention relates to a positive electrode active material for lithium ion batteries, a method of producing the same, an electrode for lithium ion batteries, and a lithium ion battery, and more particularly, to a technology of a lithium ion battery which is capable of improving a charge and discharge capacity and high-rate characteristics by controlling the surface area and the crystal shape of $LiMPO_4$ (provided that, M represents one or more kinds selected from a group consisting of Mn, Co, and Ni) particles.

BACKGROUND

Recently, as a battery that meets the expectations for miniaturization, lightness, and high capacity, a non-aqueous electrolytic solution-based secondary battery such as a lithium ion battery has been suggested and put into practical use. The lithium ion battery includes a positive electrode and a negative electrode which have properties capable of reversibly intercalating and deintercalating lithium ions, and a non-aqueous electrolyte.

The lithium ion battery is small in size, is light in weight, and has high energy compared to secondary batteries such as a lead battery, a nickel-cadmium battery, and a nickel-hydrogen battery in the related art, and thus the lithium ion battery has been used as a power supply of a portable electronic apparatus such as a cellular phone, and a notebook type personal computer. In addition, recently, an examination also has been made for a high-output power supply of an electric vehicle, a hybrid vehicle, and an electric tool. High-speed charge and discharge characteristics have been demanded for the electrode active material of the battery that is used as the high-output power supply.

Therefore, from the viewpoints of high functionality, high capacity, low cost, and the like of the above-described secondary battery, as a positive electrode active material, various kinds of materials have been examined. Among these, an olivine-type phosphate-based electrode active material represented by $LiMnPO_4$ or $LiCoPO_4$ has attracted attention as an electrode active material from the viewpoints of safety, abundant resources, and low cost.

However, with regard to the olivine-type phosphate-based electrode active material, a problem of poor material utilization under low-rate discharge conditions has been frequently pointed out (refer to Non-Patent Document 1 and the like).

As one problem of the poor material utilization, a problem of slowness in Li diffusion inside an active material, which is derived from a structure of the olivine-type phosphate-based electrode active material, is an exemplary example.

In the olivine-type phosphate-based electrode active material, it is known that the Li diffusion inside the active material occurs only in a b-axis direction of a crystal lattice while being accompanied with phase conversion of two phases of $LiMPO_4$ (M represents one or more kinds selected from a group consisting of Mn, Co, and Ni) and $MPO_4$ (M represents one or more kinds selected from a group consisting of Mn, Co, and Ni) (refer to Non-Patent Document 2), and it is described that the olivine-type phosphate-based electrode active material is unsuitable for high-speed charge and discharge.

As an effective method to solve the problem, a method of shortening the crystal lattice length of $LiMPO_4$ (M represents one or more kinds selected from a group consisting of Mn, Co, and Ni) particles in a b-axis direction for the purpose of shortening a Li diffusion distance in the particles, a method of making primary particles of the particles have a sheet-shaped crystal shape that is thin in the b-axis direction, or a method of making $LiMPO_4$ particles fine for the purpose of increasing a reaction area between Li and $LiMPO_4$ particles are exemplary examples.

As a method of making the $LiMPO_4$ particles fine, a method of making the $LiMPO_4$ particles fine by mechanical pulverization is general (refer to Patent Document 1 and the like).

In addition, as another method, a method of making particles fine using polyhydric alcohols such as glycols and polyols which have a high boiling point is suggested (refer to Patent Document 2 and the like).

This method is a method of allowing $LiMPO_4$ particles to precipitate while heating a sufficient amount of precursor in the polyhydric alcohols such as glycols and polyols which have a high boiling point.

CITATION LIST

Patent Document

[Patent Document 1] Republished Japanese Translation of WO2007/034823 of the PCT International Publication for Patent Applications
[Patent Document 2] PCT Japanese Translation Patent Publication No. 2009-532323

Non-Patent Document

[Non-Patent Document 1] A. K. Padhi, K. S. Nanjundaswamy, and J. B. Goodenough, J. Electrochem. Soc., Vol. 144, No. 4, 1 30 pp 1188-1193 (1997)
[Non-Patent Document 2] A. Yamada, H. Koizumi, S. Nishimura, N. Sonoyama, R. Kanno, M. Yonemura, T. Nakamura, and Y. Kobayashi, Nature Materials 5, pp 357-360 (2006)

SUMMARY OF INVENTION

Technical Problem

However, in the method of making particles fine by the mechanical pulverization in the related art, it is difficult to shorten the crystal lattice length of particles in the b-axis direction. In addition, the mechanical pulverization has problems in that there is a limit for making particles fine, and it is difficult to make the particles sufficiently fine to reach a target particle size.

In a further not preferable aspect, the mechanical pulverization is prone to apply damage such as distortion or cracking to the LiMPO$_4$ particles, and thus LiMPO$_4$ that is inactive for charge and discharge has a tendency to be generated. As a result, there is a problem in that sufficient charge and discharge characteristics may not be obtained.

On the other hand, in the method of making particles fine using the polyhydric alcohols having a high boiling point, the particles are made finer compared to the mechanical pulverization. However, since the particles that are obtained have a spherical shape, there is a problem in that it is difficult to shorten the crystal lattice length of the particles in the b-axis direction, and thus it is difficult to obtain sufficient charge and discharge characteristics.

The invention has been made to solve the above-described problems, and an object thereof is to provide a positive electrode active material for lithium ion batteries, which may be in the form of fine particles with good crystallinity and high purity by suppressing grain growth, and which is capable of improving the charge and discharge capacity and the high-rate characteristics, a method of producing a positive electrode active material for lithium ion batteries, which is capable of producing a positive electrode active material for the lithium ion batteries, an electrode for lithium ion batteries, and a lithium ion battery.

Solution to Problem

The present inventors extensively studied to solve the above-described problems, and as a result, they found that in an X-ray diffraction pattern of a positive electrode active material for lithium ion batteries, which is formed from LiMPO$_4$ (provided that, M represents one or more kinds selected from a group consisting of Mn, Co, and Ni), when a ratio I(020)/I(200) of the X-ray intensity I(020) of a (020) plane around a diffraction angle 2θ of 29° to the X-ray intensity I(200) of a (200) plane around a diffraction angle 2θ of 17° is set to 3.00 to 5.00, a positive electrode active material for lithium ion batteries, which is very fine, which has high purity and good crystallinity, and which is expressed by LiMPO$_4$, may be realized, and they have accomplished the invention.

In addition, the present inventors have found that when one kind or two kinds selected from a group consisting of ammonia and amine-type compounds are added to a raw material slurry obtained by mixing a Li source, a P source, and an M source (provided that, M represents one or more kinds selected from a group consisting of Mn, Co, and Ni) with a solvent containing water as a main component in such a manner that % by mole of an ammonia group of the ammonia or the amine-type compounds with respect to the M source becomes 1% by mole to 12% by mole to obtain a mixture, and then the mixture is heated to a temperature equal to or higher than the boiling point of the raw material slurry, a positive electrode active material for lithium ion batteries, which is very fine, which has high purity and good crystallinity, and which is expressed by LiMPO$_4$, may be easily produced, and they accomplished the present invention.

That is, according to an aspect of the invention, there is provided a positive electrode active material for lithium ion batteries which is formed from LiMPO$_4$ (provided that, M represents one or more kinds selected from a group consisting of Mn, Co, and Ni). In an X-ray diffraction pattern, a ratio I(020)/I(200) of the X-ray intensity I(020) of a (020) plane around a diffraction angle 2θ of 29° to the X-ray intensity I(200) of a (200) plane around a diffraction angle 2θ of 17° is 3.00 to 5.00.

In the positive electrode active material for lithium ion batteries of the invention, it is preferable that the specific surface area be 15 m$^2$/g to 50 m$^2$/g.

According to another aspect of the invention, there is provided a method of producing a positive electrode active material for lithium ion batteries, which is formed from LiMPO$_4$ (provided that, M represents one or more kinds selected from a group consisting of Mn, Co, and Ni), by a hydrothermal synthesis method. The method includes: a step of adding one kind or two kinds selected from a group consisting of ammonia and amine-type compounds to raw material slurry obtained by mixing a Li source, a P source, and an M source (provided that, M represents one or more kinds selected from a group consisting of Mn, Co, and Ni) with a solvent containing water as a main component in such a manner that % by mole of an ammonia group of the ammonia or the amine-type compounds with respect to the M source becomes 1% by mole to 12% by mole to obtain a mixture; and a step of heating the mixture to a temperature equal to or higher than the boiling point of the raw material slurry.

According to still another aspect of the invention, there is provided an electrode for lithium ion batteries which contains the positive electrode active material for lithium ion batteries of the invention.

According to still another aspect of the invention, there is provided a lithium ion battery including the electrode for lithium ion batteries of the invention.

Advantageous Effects of Invention

According to the positive electrode active material for lithium ion batteries of the invention, in the X-ray diffraction pattern of LiMPO$_4$ (provided that, M represents one or more kinds selected from a group consisting of Mn, Co, and Ni), since the ratio I(020)/I(200) of the X-ray intensity I(020) of a (020) plane around a diffraction angle 2θ of 29° to the X-ray intensity I(200) of a (200) plane around a diffraction angle 2θ of 17° is set to 3.00 to 5.00, the purity and crystallinity of the positive electrode active material for lithium ion batteries, which is expressed by LiMPO$_4$, may be increased, and the positive electrode active material may be in the form of very fine particles. Accordingly, a positive electrode active material for lithium ion batteries, which is very fine, which has high purity and good crystallinity, and which is expressed by LiMPO$_4$, may be provided.

Furthermore, when an electrode for lithium ion batteries is prepared using the positive electrode active material for lithium ion batteries, and a lithium ion battery is prepared using the electrode for lithium ion batteries, a lithium ion battery in which a charge and discharge capacity and high-rate characteristics are improved may be provided.

According to the method of producing a positive electrode active material for lithium ion batteries of the invention, since one kind or two kinds selected from a group consisting of ammonia and amine-type compounds is added to a raw material slurry obtained by mixing a Li source, a P source, and an M source (provided that, M represents one or more kinds selected from a group consisting of Mn, Co, and Ni) with a solvent containing water as a main component in such a manner that % by mole of an ammonia group of the ammonia or the amine-type compounds with respect to the M source becomes 1% by mole to 12% by mole to obtain a mixture, and then the mixture is heated to a temperature equal to or higher than the boiling point of the raw material slurry, a positive electrode active material for lithium ion batteries, which has high purity and good crystallinity, which is very fine, and which is expressed by LiMPO$_4$, may be easily produced.

DESCRIPTION OF EMBODIMENTS

Figure 1:
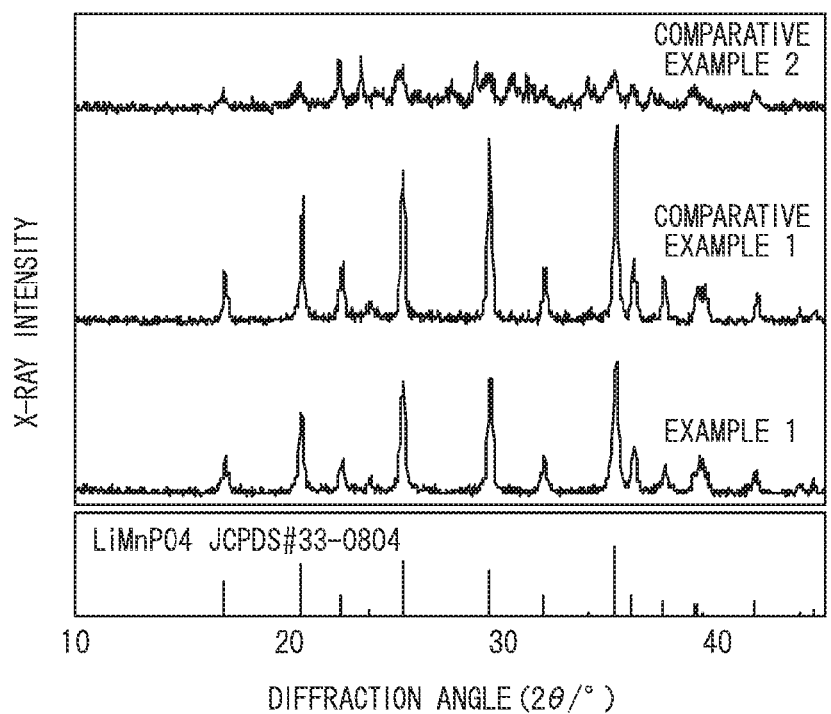
FIG. 1 is a diagram illustrating X-ray diffraction patterns of powder of Example 1 of the invention, and Comparative Examples 1 and 2.

An embodiment for carrying out a positive electrode active material for lithium ion batteries of the invention, a production method thereof, an electrode for lithium ion batteries, and a lithium ion battery will be described.

In addition, the embodiment will be described in detail for easy comprehension of the gist of the invention, and the embodiment is not intended to limit the invention unless otherwise stated.

[Positive Electrode Active Material for Lithium Ion Batteries]

The positive electrode active material for lithium ion batteries of the embodiment is a positive electrode active material for lithium ion batteries, which is formed from LiMPO$_4$ (provided that, M represents one or more kinds selected from a group consisting of Mn, Co, and Ni) particles. In an X-ray diffraction pattern, a ratio I(020)/I(200) of the X-ray intensity I(020) of a (020) plane around a diffraction angle 2θ of 29° to the X-ray intensity I(200) of a (200) plane around a diffraction angle 2θ of 17° is 3.00 to 5.00.

Here, the reason why the ratio I(020)/I(200) of the X-ray intensity I(020) of a (020) plane to the X-ray intensity I(200) of a (200) plane is set to 3.00 to 5.00 is that the range is a range capable of shortening a crystal lattice length of LiMPO$_4$ particles in a b-axis direction.

In addition, when the ratio I(020)/I(200) deviates from the above-described range, the shape of the particles become closer to a spherical shape, and as a result, the crystal lattice length of the LiMPO$_4$ particles in the b-axis direction increases.

It is preferable that a specific surface area of the LiMPO$_4$ particles be 15 m$^2$/g to 50 m$^2$/g, and more preferably 25 m$^2$/g to 40 m$^2$/g.

Here, the reason why the specific surface area is set to 15 m$^2$/g to 50 m$^2$/g is as follows. When the specific surface area is less than 15 m$^2$/g, the LiMPO$_4$ particles are not made sufficiently fine, and as a result, it is difficult to obtain very fine LiMPO$_4$ particles with high purity and satisfactory crystallinity. On the other hand, when the specific surface area exceeds 50 m$^2$/g, the LiMPO$_4$ particles are made excessively fine, and thus it is difficult to maintain a satisfactory crystallinity. As a result, it is difficult to obtain very fine LiMPO$_4$ particles with high purity and satisfactory crystallinity. Therefore, this range is not preferable.

[Method of Producing Positive Electrode Active Material for Lithium Ion Batteries]

The method of producing positive electrode active material for lithium ion batteries of the embodiment is a method of producing the positive electrode active material for lithium ion batteries, which is formed from LiMPO$_4$ (provided that, M represents one or more kinds selected from a group consisting of Mn, Co, and Ni), by a hydrothermal synthesis method. The method includes a step of adding one kind or two kinds selected from a group consisting of ammonia and amine-type compounds to raw material slurry obtained by mixing a Li source, a P source, and an M source (provided that, M represents one or more kinds selected from a group consisting of Mn, Co, and Ni) with a solvent containing water as a main component in such a manner that % by mole of an ammonia group of the ammonia or the amine-type compounds with respect to the M source becomes 1% by mole to 12% by mole to obtain a mixture, and a step of heating the mixture to a temperature equal to or higher than the boiling point of the raw material slurry.

Examples of the Li source include hydroxides such as lithium hydroxide (LiOH), lithium salts of inorganic acids such as lithium carbonate (Li$_2$CO$_3$), lithium chloride (LiCl), lithium nitrate (LiNO$_3$), lithium phosphate (Li$_3$PO$_4$), dilithium hydrogen phosphate (Li$_2$HPO$_4$), and lithium dihydrogen phosphate (LiH$_2$PO$_4$), lithium salts of organic acids such as lithium acetate (LiCH$_3$COO) and lithium oxalate ((COOLi)$_2$), hydrates thereof, and the like. One or more kinds selected from these may be suitably used.

As the P source, one or more selected from phosphoric acids such as orthophosphoric acid (H$_3$PO$_4$) and metaphosphoric acid (HPO$_3$), phosphates such as ammonium dihydrogen phosphate (NH$_4$H$_2$PO$_4$), diammonium hydrogen phosphate ((NH$_4$)$_2$HPO$_4$), ammonium phosphate ((NH$_4$)$_3$PO$_4$), lithium phosphate (Li$_3$PO$_4$), dilithium hydrogen phosphate (Li$_2$HPO$_4$), and lithium dihydrogen phosphate (LiH$_2$PO$_4$), and hydrates thereof may be suitably used.

As the M source, a compound containing one or more kinds selected from a group consisting of those of Mn, Co, and Ni, that is, one or more kinds among a Mn source, a Co source, and a Ni source are preferable.

As the Mn source, a Mn salt is preferable, and for example, one or more kinds selected from manganese (II) chloride (MnCl$_2$), manganese (II) sulfate (MnSO$_4$), manganese (II) nitrate (Mn(NO$_3$)$_2$), manganese (II) acetate (Mn(CH$_3$COO)$_2$), and hydrates thereof are preferable.

As the Co source, a Co salt is preferable, and for example, one or more kinds selected from cobalt (II) chloride (CoCl$_2$), cobalt (II) sulfate (CoSO$_4$), cobalt (II) nitrate (Co(NO$_3$)$_2$), cobalt (II) acetate (Co(CH$_3$COO)$_2$), and hydrates thereof are preferable.

As the Ni source, a Ni salt is preferable, and for example, one or more kinds selected from nickel (II) chloride (NiCl$_2$), nickel (II) sulfate (NiSO$_4$), nickel (II) nitrate (Ni(NO$_3$)$_2$), nickel (II) acetate (Ni(CH$_3$COO)$_2$), and hydrates thereof are preferable.

The solvent containing water as a main component represents any one of water alone, and a water-based solvent that contains water as a main component and contains an aqueous solvent such as alcohol as necessary.

The aqueous solvent may be a solvent capable of dissolving the Li source, the P source, and the M source, and is not particularly limited. Examples of the aqueous solvent include alcohols such as methanol, ethanol, 1-propanol, 2-propanol (isopropyl alcohol: IPA), butanol, pentanol, hexanol, octanol, diacetone alcohol, esters such as ethyl acetate, butyl acetate, ethyl lactate, propylene glycol monomethyl ether acetate, propylene glycol monoethyl ether acetate, γ-butyrolactone, ethers such as diethyl ether, ethylene glycol monomethyl ether (methyl cellosolve), ethylene glycol monoethyl ether (ethyl cellosolve), ethylene glycol monobutyl ether (butyl cellosolve), diethylene glycol monomethyl ether, and diethylene glycol monoethyl ether, ketones such as acetone, methyl ethyl ketone (MEK), methyl isobutyl ketone (MIBK), acetylacetone, and cyclohexanone, amides such as dimethylformamide, N,N-dimethylacetoacetamide, and N-methylpyrrolidone, glycols such as ethylene glycol, diethylene glycol, and propylene glycol, and the like. These may be used alone or two or more kinds thereof may be mixed and used.

These Li source, P source, and M source are put into a solvent containing water as a main component in such a manner that a molar ratio (Li source: P source: M source) thereof becomes 3:1:1, and the sources are stirred and mixed to obtain a raw material slurry.

When considering uniform mixing of the Li source, the P source, and the M source, a method in which the Li source, the P source, and the M source are made into aqueous solutions, and then mixed is preferable.

Since it is necessary to obtain very fine $LiMPO_4$ particles with high purity and high crystallinity, it is preferable that the molar concentration of the Li source, the P source, and the M source in the raw material slurry be 1.5 mol/L to 4.0 mol/L.

Next, one kind or two kinds selected from a group consisting of ammonia and amine-type compounds are added to the raw material slurry in such a manner that % by mole of an ammonia group of the ammonia or the amine-type compounds with respect to the M source becomes 1% by mole to 12% by mole to obtain a mixture.

As the amine-type compounds, one kind selected from methyl amine, diethyl amine, ethyl amine, diethyl amine, aniline, and toluidine may be used alone, or two or more kinds thereof may be mixed and used.

Particularly, when considering the viewpoints of effectively suppressing grain growth of $LiMPO_4$ particles that are generated, and of easy removal of impurities from the generated $LiMPO_4$ particles, ammonia is preferable.

Here, the reason why % by mole of the ammonia group of the ammonia or the amine-type compounds to the M source is limited to 1% by mole to 12% by mole is as follows. When % by mole is less than 1% by mole, an addition effect of the ammonia or amine-type compounds is not sufficiently exhibited, and thus it is difficult to obtain very fine $LiMPO_4$ particles with high crystallinity. Accordingly, this range is not preferable.

On the other hand, when % by mole exceeds 12% by mole, the addition effect of the ammonia or amine-type compounds is saturated. Therefore, even when the ammonia or amine-type compounds are further added, a new addition effect is not obtained, and this addition adversely leads to generation of a second phase different from the target $LiMPO_4$. Accordingly, this range is not preferable.

Next, the mixture is put into a pressure resistant vessel, and the mixture is heated to a temperature equal to or higher than the boiling point of the raw material slurry, and a hydrothermal treatment is performed for 1 hour to 48 hours to obtain $LiMPO_4$ particles.

When reaching the temperature equal to or higher than the boiling point of the raw material slurry, a pressure inside the pressure resistant vessel becomes, for example, 0.1 MPa to 0.7 MPa.

In this case, the particle size of the $LiMPO_4$ particles may be controlled to a desired size by adjusting the temperature and the time during the hydrothermal treatment.

In this manner, very fine $LiMPO_4$ particles with high purity and satisfactory crystallinity may be obtained.

As described above, according to the positive electrode active material for lithium ion batteries of the embodiment, in an X-ray diffraction pattern of the positive electrode active material for lithium ion batteries, which is formed from $LiMPO_4$ (provided that, M represents one or more kinds selected from a group consisting of Mn, Co, and Ni) particles, since the ratio I(020)/I(200) of the X-ray intensity I(020) of a (020) plane around a diffraction angle 2θ of 29° to the X-ray intensity I(200) of a (200) plane around a diffraction angle 2θ of 17° is set to 3.00 to 5.00, the purity and crystallinity of the $LiMPO_4$ particles may be increased, and the $LiMPO_4$ particles may be in the form of very fine particles. Accordingly, very fine $LiMPO_4$ particles with high purity and high crystallinity may be provided.

Furthermore, when an electrode for lithium ion batteries is prepared using the $LiMPO_4$ particles, and a lithium ion battery is prepared using the electrode for lithium ion batteries, a lithium ion battery in which the charge and discharge capacity and the high-rate characteristics are improved may be provided.

According to the method of producing the positive electrode active material for lithium ion batteries of the embodiment, since a Li source, a P source, and an M source (provided that, M represents one or more kinds selected from a group consisting of Mn, Co, and Ni) is mixed with a solvent containing water as a main component to obtain a raw material slurry, one kind or two kinds selected from a group consisting of ammonia and amine-type compounds is added to the raw material slurry in such a manner that % by mole of an ammonia group of the ammonia or the amine-type compounds with respect to the M source becomes 1% by mole to 12% by mole to obtain a mixture, and the mixture is heated to a temperature equal to or higher than the boiling point of the raw material slurry, very fine $LiMPO_4$ particles with high purity and satisfactory crystallinity may be easily produced.

EXAMPLES

Hereinafter, the invention will be described in detail with reference to examples and comparative examples, but the invention is not limited thereto.

Example 1

Synthesis of $LiMnPO_4$ was performed as described below.

$Li_3PO_4$ as the Li source and the P source, and an aqueous $MnSO_4$ solution as the Mn source were used, and these were mixed in a molar ratio of Li:Mn:P=3:1:1 to prepare 200 ml of a raw material slurry.

Then, ammonia water was mixed with the raw material slurry at 5% by mole in terms of ammonia with respect to Mn of $MnSO_4$, and then the resultant mixture was put into a pressure resistant vessel. Then, hydrothermal synthesis was performed at 120° C. for 2 hours. After the reaction, the resultant product was cooled to room temperature, and a precipitate of a cake-shaped reaction product was obtained. The precipitate was sufficiently washed with distilled water a total of five times, and a moisture content of 30% was maintained to prevent it from drying, whereby a cake-shaped material of Example 1 was obtained.

Next, a small sample was collected from the precipitate, and this sample was vacuum-dried at 70° C. for 2 hours, whereby a powder of Example 1 was obtained.

The powder was identified using an X-ray diffraction apparatus, and it was confirmed that single-phase $LiMnPO_4$ was generated. In addition, from the X-ray diffraction pattern of the powder, it could be seen that the ratio $I(020)/I(200)$ of the X-ray intensity $I(020)$ of a (020) plane around a diffraction angle 2θ of 29° to the X-ray intensity $I(200)$ of a (200) plane around a diffraction angle 2θ of 17° was 3.38.

In addition, a specific surface area of the powder was measured using a specific surface area meter Belsorp II (manufactured by BEL Japan, Inc.), and a measured specific surface area was 30.1 $m^2/g$.

The X-ray diffraction pattern of the powder of Example 1 is shown in FIG. 1. In addition, the positions of diffraction lines of $LiMnPO_4$, which are described in JCPDS Card No. 33-0804, are shown at the bottom of FIG. 1.

Example 2

Synthesis of $LiMnPO_4$ was performed as described below.

$Li_3PO_4$ as the Li source and the P source, and aqueous $MnSO_4$ solution as the Mn source were used, and these were mixed in a molar ratio of Li:Mn:P=3:1:1 to prepare 200 ml of a raw material slurry.

Then, ammonia water was mixed with the raw material slurry at 10% by mole in terms of ammonia with respect to Mn of $MnSO_4$, and then the resultant mixture was put into a pressure resistant vessel. Then, hydrothermal synthesis was performed at 120° C. for 2 hours. After the reaction, the resultant product was cooled to room temperature, and a precipitate of a cake-shaped reaction product was obtained. The precipitate was sufficiently washed with distilled water a total of five times, and a moisture content of 30% was maintained to prevent it from drying, whereby a cake-shaped material of Example 2 was obtained.

Next, a small sample was collected from the precipitate, and this sample was vacuum-dried at 70° C. for 2 hours to obtain the powder of Example 2.

The powder was identified using an X-ray diffraction apparatus, and it was confirmed that single-phase $LiMnPO_4$ was generated. In addition, from the X-ray diffraction pattern of the powder, it could be seen that the ratio $I(020)/I(200)$ of the X-ray intensity $I(020)$ of a (020) plane around a diffraction angle 2θ of 29° to the X-ray intensity $I(200)$ of a (200) plane around a diffraction angle 2θ of 17° was 4.31.

In addition, a specific surface area of the powder was measured using a specific surface area meter Belsorp II (manufactured by BEL Japan, Inc.), and a measured specific surface area was 43.2 $m^2/g$.

Comparative Example 1

Synthesis of $LiMnPO_4$ was performed as described below.

$Li_3PO_4$ as the Li source and the P source, and aqueous $MnSO_4$ solution as the Mn source were used, and these were mixed in a molar ratio of Li:Mn:P=3:1:1 to prepare 200 ml of a raw material slurry.

Next, the raw material slurry was put into a pressure resistant vessel. Then, hydrothermal synthesis was performed at 120° C. for 2 hours. After the reaction, the resultant product was cooled to room temperature, and a precipitate of a cake-shaped reaction product was obtained. The precipitate was sufficiently washed with distilled water a total of five times, and a moisture content of 30% was maintained to prevent it from drying, whereby a cake-shaped material of Comparative Example 1 was obtained.

Next, a small sample was collected from the precipitate, and this sample was vacuum-dried at 70° C. for 2 hours, to obtain the powder of Comparative Example 1.

The powder was identified using an X-ray diffraction apparatus, it was confirmed that single-phase $LiMnPO_4$ was generated. In addition, from the X-ray diffraction pattern of the powder, it could be seen that the ratio $I(020)/I(200)$ of the X-ray intensity $I(020)$ of a (020) plane around a diffraction angle 2θ of 29° to the X-ray intensity $I(200)$ of a (200) plane around a diffraction angle 2θ of 17° was 2.87.

In addition, a specific surface area of the powder was measured using a specific surface area meter Belsorp II (manufactured by BEL Japan, Inc.), and a measured specific surface area was 12.6 $m^2/g$.

The X-ray diffraction pattern of the powder of Comparative Example 1 is shown in FIG. 1.

Comparative Example 2

Synthesis of $LiMnPO_4$ was performed as described below.

$Li_3PO_4$ as the Li source and the P source, and aqueous $MnSO_4$ solution as the Mn source were used, and these were mixed in a molar ratio of Li:Mn:P=3:1:1 to prepare 200 ml of a raw material slurry.

Then, ammonia water was mixed with the raw material slurry at 15% by mole in terms of ammonia with respect to Mn of $MnSO_4$, and then the resultant mixture was put into a pressure resistant vessel. Then, hydrothermal synthesis was performed at 120° C. for 2 hours. After the reaction, the resultant product was cooled to room temperature, and a precipitate of a cake-shaped reaction product was obtained. The precipitate was sufficiently washed with distilled water a total of five times, and a moisture content of 30% was maintained to prevent it from drying, whereby a cake-shaped material of Comparative Example 2 was obtained.

Next, a small sample was collected from the precipitate, and this sample was vacuum-dried at 70° C. for 2 hours, and a powder of Comparative Example 2 was obtained.

The powder was identified using an X-ray diffraction apparatus, and it was confirmed that the product was a mixed material of $Li_3PO_4$ and a $Mn_2P_2O_7$ hydrate.

In addition, a specific surface area of the powder was measured using a specific surface area meter Belsorp II (manufactured by BEL Japan, Inc.), and the measured specific surface area was 32.1 $m^2/g$.

The X-ray diffraction pattern of the powder of Comparative Example 2 is shown in FIG. 1.

Example 3

Synthesis of $LiCoPO_4$ was performed as described below.

$Li_3PO_4$ as the Li source and the P source, and aqueous $CoSO_4$ solution as the Co source were used, and these were mixed in a molar ratio of Li:Co:P=3:1:1 to prepare 200 ml of a raw material slurry.

Then, ammonia water was mixed with the raw material slurry at 5% by mole in terms of ammonia with respect to Co of $CoSO_4$, and then the resultant mixture was put into a pressure resistant vessel. Then, hydrothermal synthesis was performed at 180° C. for 12 hours. After the reaction, the resultant product was cooled to room temperature, and a precipitate of a cake-shaped reaction product was obtained. The precipitate was washed with distilled water a total of five times, and a moisture content of 30% was maintained to prevent it from drying, whereby a cake-shaped material of Example 3 was obtained.

Next, a small sample was collected from the precipitate, and this sample was vacuum-dried at 70° C. for 2 hours, whereby a powder of Example 3 was obtained.

The powder was identified using an X-ray diffraction apparatus, and it was confirmed that single-phase $LiCoPO_4$ was generated. In addition, from the X-ray diffraction pattern of the powder, it could be seen that the ratio I(020)/I (200) of the X-ray intensity I(020) of a (020) plane around a diffraction angle 2θ of 29° to the X-ray intensity I(200) of a (200) plane around a diffraction angle 2θ of 17° was 3.76.

In addition, a specific surface area of the powder was measured using a specific surface area meter Belsorp II (manufactured by BEL Japan, Inc.), and the measured specific surface area was 15.3 $m^2/g$.

Figure 2:
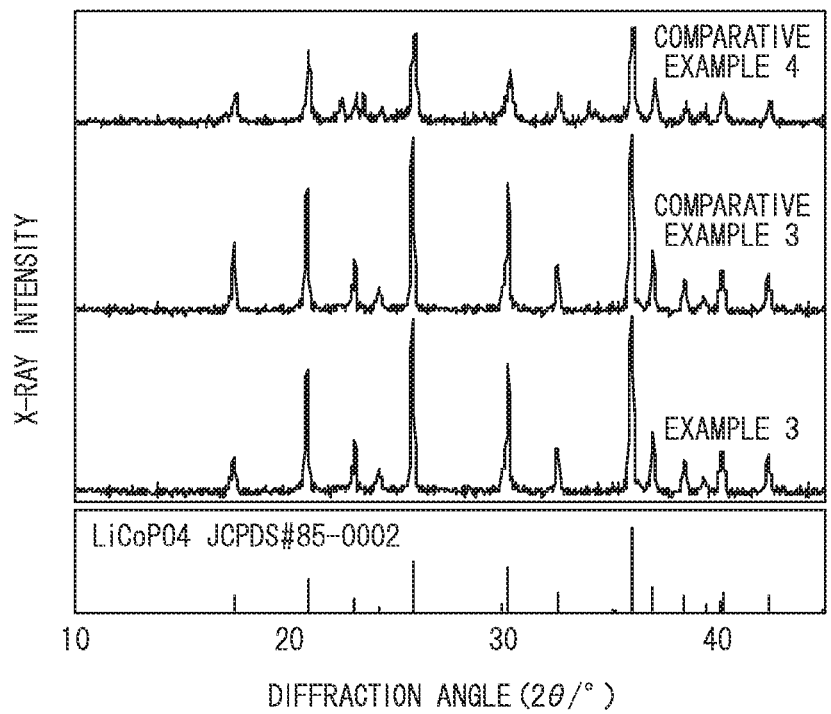
FIG. 2 is a diagram illustrating X-ray diffraction patterns of powder of Example 3 of the invention, and Comparative Examples 3 and 4.

The X-ray diffraction pattern of the powder of Example 3 is shown in FIG. 2. In addition, the positions of diffraction lines of $LiCoPO_4$, which are described in JCPDS Card No. 85-0002, are shown at the bottom of FIG. 2.

Example 4

Synthesis of $LiCoPO_4$ was performed as described below.

$Li_3PO_4$ as the Li source and the P source, and aqueous $CoSO_4$ solution as the Co source were used, and these were mixed in a molar ratio of Li:Co:P=3:1:1 to prepare 200 ml of a raw material slurry.

Then, ammonia water was mixed with the raw material slurry at 10% by mole in terms of ammonia with respect to Co of $CoSO_4$, and then the resultant mixture was put into a pressure resistant vessel. Then, hydrothermal synthesis was performed at 180° C. for 12 hours. After the reaction, the resultant product was cooled to room temperature, and a precipitate of a cake-shaped reaction product was obtained. The precipitate was sufficiently washed with distilled water a total of five times, and a moisture content of 30% was maintained to prevent it from drying, whereby a cake-shaped material of Example 4 was obtained.

Next, a small sample was collected from the precipitate, and this sample was vacuum-dried at 70° C. for 2 hours, whereby a powder of Example 4 was obtained.

The powder was identified using an X-ray diffraction apparatus, and it was confirmed that single-phase $LiCoPO_4$ was generated. In addition, from the X-ray diffraction pattern of the powder, it could be seen that the ratio I(020)/I (200) of the X-ray intensity I(020) of a (020) plane around a diffraction angle 2θ of 29° to the X-ray intensity I(200) of a (200) plane around a diffraction angle 2θ of 17° was 3.21.

In addition, a specific surface area of the powder was measured using a specific surface area meter Belsorp II (manufactured by BEL Japan, Inc.), and the measured specific surface area was 19.4 $m^2/g$.

Comparative Example 3

Synthesis of $LiCoPO_4$ was performed as described below.

$Li_3PO_4$ as the Li source and the P source, and aqueous $CoSO_4$ solution as the Co source were used, and these were mixed in a molar ratio of Li:Co:P=3:1:1 to prepare 200 ml of raw material slurry.

The raw material slurry was put into a pressure resistant vessel. Then, hydrothermal synthesis was performed at 180° C. for 12 hours. After the reaction, the resultant product was cooled to room temperature, and a precipitate of a cake-shaped reaction product was obtained.

The precipitate was sufficiently washed with distilled water a total of five times, and a moisture content of 30% was maintained to prevent it from drying, whereby a cake-shaped material of Comparative Example 3 was obtained.

Next, a small sample was collected from the precipitate, and this sample was vacuum-dried at 70° C. for 2 hours, whereby a powder of Comparative Example 3 was obtained.

The powder was identified using an X-ray diffraction apparatus, and it was confirmed that single-phase $LiCoPO_4$ was generated. In addition, from the X-ray diffraction pattern of the powder, it could be seen that the ratio I(020)/I (200) of the X-ray intensity I(020) of a (020) plane around a diffraction angle 2θ of 29° to the X-ray intensity I(200) of a (200) plane around a diffraction angle 2θ of 17° was 1.91.

In addition, a specific surface area of the powder was measured using a specific surface area meter Belsorp II (manufactured by BEL Japan, Inc.), and the measured specific surface area was 8.2 $m^2/g$.

The X-ray diffraction pattern of the powder of Comparative Example 3 is shown in FIG. 2.

Comparative Example 4

Synthesis of $LiCoPO_4$ was performed as described below.

$Li_3PO_4$ as the Li source and the P source, and aqueous $CoSO_4$ solution as the Co source were used, and these were mixed in a molar ratio of Li:Co:P=3:1:1 to prepare 200 ml of raw material slurry.

Then, ammonia water was mixed with the raw material slurry at 15% by mole in terms of ammonia with respect to Co of $CoSO_4$, and then the resultant mixture was put into a pressure resistant vessel. Then, hydrothermal synthesis was performed at 180° C. for 12 hours. After the reaction, the resultant product was cooled to room temperature, and a precipitate of a cake-shaped reaction product was obtained. The precipitate was sufficiently washed with distilled water a total of five times, and a moisture content of 30% was maintained to prevent it from drying, whereby a cake-shaped material of Comparative Example 4 was obtained.

Next, a small sample was collected from the precipitate, and this sample was vacuum-dried at 70° C. for 2 hours, whereby a powder of Comparative Example 4 was obtained.

The powder was identified using an X-ray diffraction apparatus, and it was confirmed that the product was a mixed material of $Li_3PO_4$ and $Co_2P_2O_7$ hydrate.

In addition, a specific surface area of the powder was measured using a specific surface area meter Belsorp II (manufactured by BEL Japan, Inc.), and a measured specific surface area was 16.3 $m^2/g$.

The X-ray diffraction pattern of the powder of Comparative Example 4 is shown in FIG. 2.

"Preparation of Lithium Ion Battery"

The powders that were obtained in Examples 1 to 4 and Comparative Examples 1 to 4, respectively, acetylene black (AB) as a conductive auxiliary agent, polyvinylidene fluoride (PVdF) as a binder, and N-methyl-2-pyrrolidinone (NMP) as a solvent were used, and these were mixed to prepare the positive electrode material paste of each of Examples 1 to 4 and Comparative Examples 1 to 4. In addition, the mass ratio of powder: AB:PVdF in the paste was 80:10:10.

Then, the positive electrode material paste was applied on aluminum (Al) foil having a thickness of 30 μm, and was dried. Then, the resultant aluminum foil was compressed at a pressure of 30 MPa to prepare a positive electrode plate.

Then, the positive electrode plate was punched in a disk shape having a diameter of 16 mm using a shaping machine, and a positive electrode was prepared for use in test.

On the other hand, a commercially available Li metal plate was used as a negative electrode, a porous polypropylene film was used as a separator, and a $LiPF_6$ solution of 1 mol/L was used as a non-aqueous electrolyte solution. In addition, lithium ion batteries of Examples 1 to 4, and Comparative Example 1 and 3 were prepared using a mixed solution in which the volume ratio between ethyl carbonate and diethyl carbonate was 1:1 as a solvent of the $LiPF_6$ solution, and a 2032 coin-type cell.

"Battery Characteristics Test A"

A battery characteristics test of the lithium ion batteries of Examples 1 and 2, and Comparative Example 1 was performed. In the test, charging was performed at an environmental temperature of 25° C. and with a charge current of 0.1 CA until an electrical potential of the positive electrode became 4.3 V with respect to an equilibrium potential of Li. Next, charging was performed until a charge current became 0.01 CA with 4.3 V with respect to the equilibrium potential of Li. Then, after a pause for one minute, discharging was performed with a discharge current of 0.1 CA until it reached 2.0 V.

Figure 3:
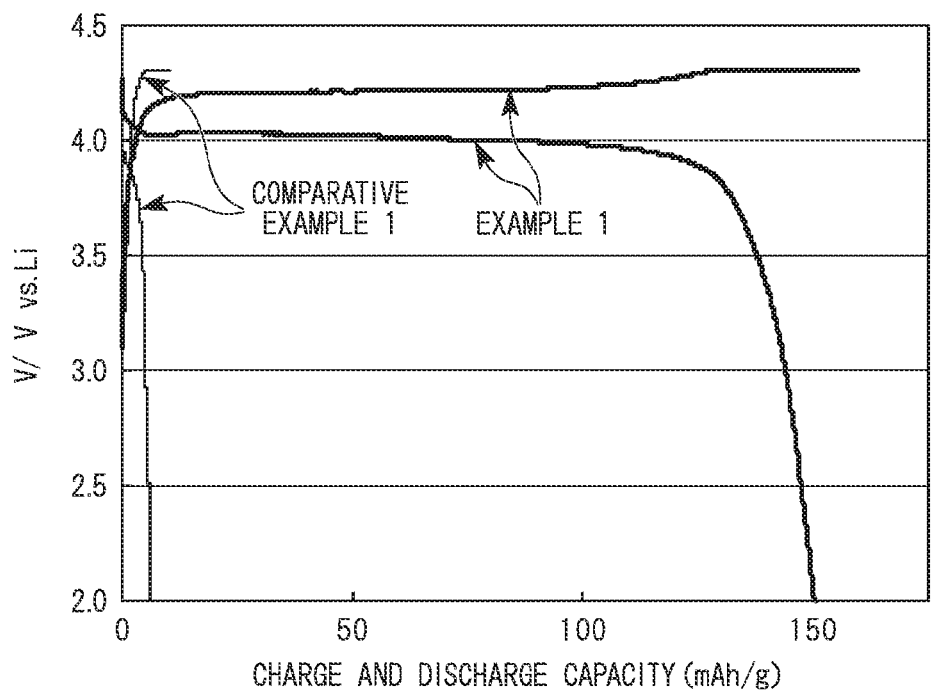
FIG. 3 is a diagram illustrating charge and discharge curves of Example 1 of the invention, and Comparative Example 1 with 0.1 CA.

0.1 C discharge capacity and 1 C discharge capacity of Examples 1 and 2, and Comparative Example 1 at an environmental temperature of 25° C. are shown in Table 1. In addition, charge and discharge curves of 0.1 CA of Example 1 and Comparative Example 1 are shown in FIG. 3.

"Battery Characteristics Test B"

A battery characteristics test of the lithium ion batteries of Examples 3 and 4, and Comparative Example 3 was performed. In the test, charging was performed at an environmental temperature of 25° C. and with a charge current of 0.1 CA until the electrical potential of the positive electrode became 5.0 V with respect to an equilibrium potential of Li. Next, charging was performed until the charge current became 0.01 CA with 5.0 V with respect to the equilibrium potential of Li. Then, after a pause of one minute, discharging was performed with a discharge current of 0.1 CA until it reached 2.0 V.

Figure 4:
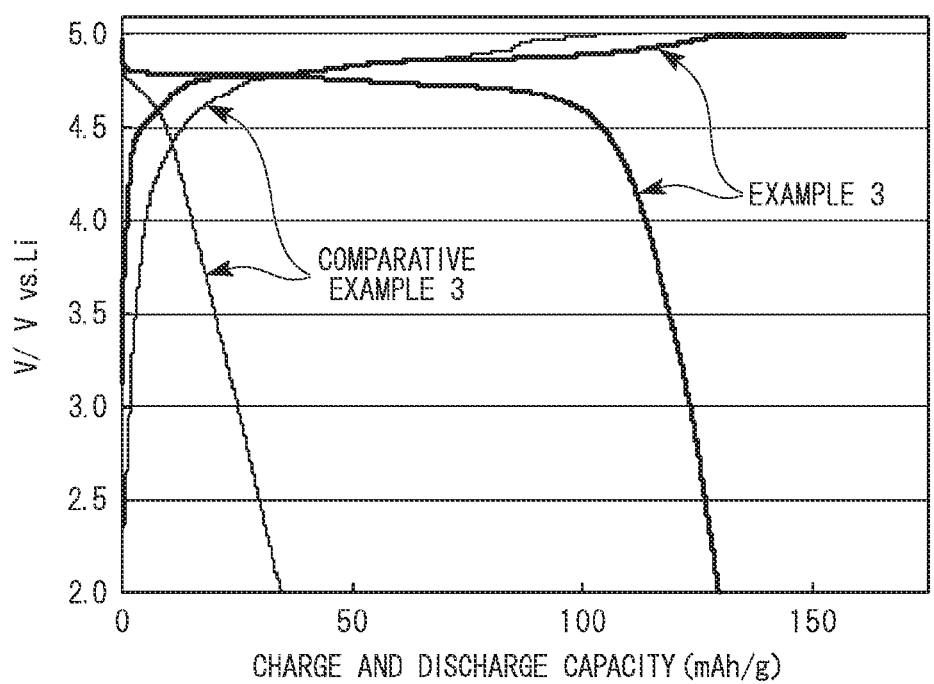
FIG. 4 is a diagram illustrating charge and discharge curves of Example 3 of the invention, and Comparative Example 3 with 0.1 CA.

0.1 C discharge capacity and 1 C discharge capacity of Examples 3 and 4, and Comparative Example 3 at the environmental temperature of 25° C. are shown in Table 2. In addition, charge and discharge curves of 0.1 CA of Examples 3 and Comparative Example 3 are shown in FIG. 4.

TABLE 1

| | Example 1 | Example 2 | Comparative Example 1 | Comparative Example 2 |
|---|---|---|---|---|
| Amount of added $NH_3$ (% by mole) | 5 | 10 | 0 | 15 |
| Crystal Phase | $LiMnPO_4$ single phase | $LiMnPO_4$ single phase | $LiMnPO_4$ single phase | $Li_3PO_4$ and hydrate of $Mn_2P_2O_7$ |
| Specific surface area ($m^2/g$) | 30.1 | 43.2 | 12.6 | 32.1 |
| I(020)/I(200) | 3.38 | 4.31 | 2.87 | — |
| 0.1 C discharge capacity (mAh/g) | 150 | 142 | 9 | — |
| 1 C discharge capacity (mAh/g) | 128 | 110 | 0.8 | — |

TABLE 2

| | Example 3 | Example 4 | Comparative Example 3 | Comparative Example 4 |
|---|---|---|---|---|
| Amount of added $NH_3$ (% by mole) | 5 | 10 | 0 | 15 |
| Crystal Phase | $LiCoPO_4$ single phase | $LiCoPO_4$ single phase | $LiCoPO_4$ single phase | $Li_3PO_4$ and hydrate of $Co_2P_2O_7$ |
| Specific surface area ($m^2/g$) | 15.3 | 19.4 | 8.2 | 16.3 |
| I(020)/I(200) | 3.76 | 3.21 | 1.91 | — |
| 0.1 C discharge capacity (mAh/g) | 130 | 127 | 34.6 | — |
| 1 C discharge capacity (mAh/g) | 50 | 60 | 3 | — |

In addition, in Examples 1 to 4, the single-phase $LiMnPO_4$ or $LiCoPO_4$ was used. However, it was confirmed that even when $LiNiPO_4$ was used in place of the single-phase $LiMnPO_4$ or $LiCoPO_4$, the same result was obtained.

In addition, it was confirmed that even when a material obtained by doping the single-phase $LiMnPO_4$ or $LiCoPO_4$ with any one of Mn, Co, and Ni was used in place of the single-phase $LiMnPO_4$ or $LiCoPO_4$, the same result was obtained.

In addition, in Examples 1 to 4, acetylene black was used as the conductive auxiliary agent. However, a carbon material such as carbon black, graphite, ketjen black, natural graphite, and artificial graphite may be use.

In addition, the commercially available Li metal plate was used as the negative electrode. However, negative electrode materials such as carbon materials including natural graphite, artificial graphite, and cokes, a lithium alloy, and $Li_4Ti_5O_{12}$ may be used in place of the Li metal plate.

In addition, the $LiPF_6$ solution was used as the non-aqueous electrolyte solution, and the solution in which the ratio between ethylene carbonate and diethyl carbonate was 1:1 was used as the solvent of the $LiPF_6$ solution. However, a $LiBF_4$ or $LiClO_4$ solution may be used in place of $LiPF_6$, and propylene carbonate or diethyl carbonate may be used in place of ethylene carbonate.

In addition, a solid electrolyte may be used in place of the electrolytic solution and the separator.

INDUSTRIAL APPLICABILITY

According to the positive electrode active material for lithium ion batteries of the invention, the purity and crystallinity of the positive electrode active material for lithium ion batteries, which is expressed by $LiMPO_4$, may be increased, and the positive electrode active material may be in the form of very fine particles. Accordingly, the invention may be suitably used as a positive electrode active material for lithium ion batteries which is expressed by $LiMPO_4$. In addition, when an electrode for lithium ion batteries is prepared using the positive electrode active material for lithium ion batteries of the invention, and a lithium ion battery is prepared using the electrode for lithium ion batteries, the invention may be appropriately used as the electrode for lithium ion batteries and the lithium ion battery.

According to the method of producing the positive electrode active material for lithium ion batteries of the invention, a positive electrode active material for lithium ion batteries, which is very fine, which has high purity and good crystallinity, and which is expressed by $LiMPO_4$, may be easily produced. Accordingly, the invention may be suitably used as a method of producing a positive electrode active material for lithium ion batteries which is expressed by $LiMPO_4$.

We claim:

1. A positive electrode active material for lithium ion batteries which is formed from $LiMPO_4$, provided that, M represents one or more kinds selected from a group consisting of Mn, Co, and Ni,
    wherein in an X-ray diffraction pattern, a ratio $I(020)/I(200)$ of the X-ray intensity $I(020)$ of a (020) plane around a diffraction angle $2\theta$ of 29° to the X-ray intensity $I(200)$ of a (200) plane around a diffraction angle $2\theta$ of 17° is 3.21 to 4.31, wherein a specific surface area of the active material is 15 $m^2/g$ to 50 $m^2/g$.

2. An electrode for lithium ion batteries, containing:
    the positive electrode active material for lithium ion batteries according to claim 1.

3. A lithium ion battery, comprising:
    the electrode for lithium ion batteries according to claim 2.

4. An electrode for lithium ion batteries, containing:
    the positive electrode active material for lithium ion batteries according to claim 1.

5. The positive electrode active material for lithium ion batteries according to claim 1, wherein the positive electrode active material is generated by a method comprising:
    preparing a raw material slurry obtained by mixing a Li source, a P source, and an M source with a solvent containing water as a main component, provided that M represents one or more kinds selected from the group consisting of Mn, Co, and Ni;
    adding one kind or two kinds selected from the group consisting of ammonia and amine-type compounds to the raw material slurry in such a manner that % by mole of an ammonia group of the ammonia or the amine-type compounds with respect to the M source becomes 1% by mole to 12% by mole to obtain a mixture; and
    heating the mixture to a temperature equal to or higher than a boiling point of the raw material slurry to generate the positive electrode active material using a hydrothermal synthesis method.

6. The positive electrode active material for lithium ion batteries according to claim 5, wherein one kind or two kinds selected from the group consisting of ammonia and amine-type compounds is added to the raw material slurry in such a manner that % by mole of an ammonia group of the ammonia or the amine-type compounds with respect to the M source becomes 5% by mole to 12% by mole.

* * * * *